(12) United States Patent
Roman Cuesta et al.

(10) Patent No.: US 12,137,126 B2
(45) Date of Patent: *Nov. 5, 2024

(54) TRANSIENT SETUP OF APPLICATIONS ON COMMUNAL DEVICES

(71) Applicant: Apple Inc., Cupertino, CA (US)

(72) Inventors: Manuel Roman Cuesta, Sunnyvale, CA (US); Yagil Burowski, Glendale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,687

(22) Filed: Oct. 4, 2023

(65) Prior Publication Data

US 2024/0031414 A1 Jan. 25, 2024

Related U.S. Application Data

(63) Continuation of application No. 18/072,460, filed on Nov. 30, 2022, now Pat. No. 11,818,180.

(Continued)

(51) Int. Cl.
*H04L 65/61* (2022.01)
*H04L 65/1069* (2022.01)
(Continued)

(52) U.S. Cl.
CPC ...... *H04L 65/1069* (2013.01); *H04L 65/1094* (2022.05); *H04L 65/61* (2022.05);
(Continued)

(58) Field of Classification Search
CPC ............ H04L 65/1069; H04L 65/1094; H04L 65/1095; H04L 65/4015; H04L 65/61; H04L 65/611; H04L 65/613; H04L 69/329

(Continued)

(56) References Cited

U.S. PATENT DOCUMENTS 7,801,953 B1 9/2010 Denman et al.
9,071,887 B2 6/2015 Yao et al.
(Continued)

FOREIGN PATENT DOCUMENTS

CA 2551263 3/2007
CA 3167133 A1 * 8/2021 .......... H04W 12/068
(Continued)

OTHER PUBLICATIONS

U.S. Appl. No. 18/072,460, "Notice of Allowance", Jun. 28, 2023, 8 pages.

(Continued)

*Primary Examiner* — Khanh Q Dinh
(74) *Attorney, Agent, or Firm* — Kilpatrick Townsend & Stockton LLP

(57) ABSTRACT

Techniques are disclosed for initiating transient sessions on a communal device. An example method includes a system receiving, from a media streaming device, a request for a transient session token for initiating a transient session of a streaming service. The system can transmit, to the media streaming device, an authentication request for authenticating a user account that is associated with the streaming service. The authentication request can be transmitted based at least in part on the receipt of the request for the transient session token. The system can receive, from the media streaming device, an authentication response based at least in part on transmitting the authentication request. The system can authenticate that the user account is associated with the streaming service based at least in part on receiving the authentication response. The system can transmit the transient session token to the media streaming device. The transient session token comprises an expiration parameter for ending the transient session of the streaming service.

20 Claims, 12 Drawing Sheets

Related U.S. Application Data

(60) Provisional application No. 63/342,384, filed on May 16, 2022.

(51) Int. Cl.
  *H04L 65/1094* (2022.01)
  *H04L 69/329* (2022.01)
  *H04L 65/401* (2022.01)
  *H04L 65/611* (2022.01)

(52) U.S. Cl.
  CPC ........ *H04L 69/329* (2013.01); *H04L 65/4015* (2013.01); *H04L 65/611* (2022.05)

(58) Field of Classification Search
  USPC ....... 709/220, 223, 225, 228, 229, 231, 203, 709/224, 226, 227
  See application file for complete search history.

(56) References Cited

U.S. PATENT DOCUMENTS

| | | | |
|---|---|---|---|
| 9,438,858 B1* | 9/2016 | Evans | H04L 65/4015 |
| 9,628,519 B2* | 4/2017 | Tang | H04M 3/523 |
| 9,741,186 B1 | 8/2017 | Lemke | |
| 9,933,620 B2* | 4/2018 | Van Heugten | G02B 27/0172 |
| 10,171,589 B2 | 1/2019 | Verma | |
| 10,247,947 B2* | 4/2019 | Van Heugten | G09G 3/32 |
| 10,938,924 B1* | 3/2021 | Jensen | H04L 67/10 |
| 11,025,598 B1* | 6/2021 | Laghaeian | H04L 63/0435 |
| 11,818,180 B1* | 11/2023 | Roman Cuesta | H04L 65/1069 |
| 2015/0301338 A1* | 10/2015 | Van Heugten | G09G 3/32 |
| | | | 345/8 |
| 2015/0341393 A1* | 11/2015 | Paxinos | H04L 51/48 |
| | | | 709/206 |
| 2015/0373057 A1* | 12/2015 | Ezell | H04L 65/1108 |
| | | | 709/204 |
| 2016/0011290 A1* | 1/2016 | Iannello | A61B 5/055 |
| | | | 600/422 |
| 2016/0366195 A1* | 12/2016 | Pattekar | H04L 61/2589 |
| 2017/0019394 A1 | 1/2017 | Yastrebenetsky et al. | |
| 2017/0078275 A1 | 3/2017 | Slovetskiy | |
| 2017/0118294 A1* | 4/2017 | Verma | H04L 41/046 |
| 2018/0039085 A1* | 2/2018 | Van Heugten | G02B 27/0172 |
| 2018/0189078 A1 | 7/2018 | Wadley et al. | |
| 2018/0190078 A1 | 7/2018 | Kim | |
| 2018/0225012 A1 | 8/2018 | Bates et al. | |
| 2018/0241879 A1* | 8/2018 | Badger | H04M 3/493 |
| 2018/0295159 A1* | 10/2018 | Avidan Herman | |
| | | | H04L 65/1069 |
| 2019/0113757 A1* | 4/2019 | Van Heugten | G02B 27/017 |
| 2019/0215327 A1 | 7/2019 | Murthy et al. | |
| 2019/0327227 A1 | 10/2019 | Tobkes et al. | |
| 2020/0104467 A1 | 4/2020 | Lesser | |
| 2020/0120094 A1 | 4/2020 | Jain et al. | |
| 2020/0267432 A1 | 8/2020 | Warrick et al. | |
| 2020/0364967 A1* | 11/2020 | Spice | G06F 3/017 |
| 2020/0380503 A1* | 12/2020 | Prokop | G06Q 20/3823 |
| 2022/0116438 A1 | 4/2022 | Bradley et al. | |

FOREIGN PATENT DOCUMENTS

| | | |
|---|---|---|
| EP | 3557450 | 10/2019 |
| EP | 3817329 | 5/2021 |

OTHER PUBLICATIONS

International Patent Application No. PCT/US2023/022277, "International Search Report and Written Opinion", Aug. 21, 2023, 12 pages.

* cited by examiner

TRANSIENT SETUP OF APPLICATIONS ON COMMUNAL DEVICES

CROSS-REFERENCES TO RELATED APPLICATIONS

This application is a continuation of U.S. patent application Ser. No. 18/072,460, filed Nov. 30, 2022, which claims the benefit of U.S. Provisional Application No. 63/342,384, filed May 16, 2022; the disclosures of which are hereby incorporated by reference in their entirety for all purposes.

BACKGROUND

Advancements in cloud computing have allowed software applications to be tailored to each user's individual preferences and experiences. These users expect the ability to access any application from any location and maintain their individualized experience. To accommodate this expectation, our home, office, and traveling environments are populated with Internet-enabled devices that can be used to access and enjoy each of these software applications.

BRIEF SUMMARY

In some implementations, a media streaming device can initiate a transient session of an application to enable a user to enjoy application content. For example, the media streaming device can detect an indication to initiate a transient session of the application. The media streaming device can then transmit a request to an application server for a transient session token based on the detected indication. The media streaming device can receive the transient session token from the application server based on the request. The transient session token can include an expiration parameter. The media streaming device can then initiate the transient session based on the transient session token, and then terminate the transient session based on the expiration parameter.

In some implementations, the media streaming device can detect the first user device and open a secure session with the device. The media streaming device can further communicate with the first user device to determine whether the first user device is within a minimum distance. Based on the first device being within the minimum distance, the media streaming device can determine whether a user wants to open a transient session of an application. The media streaming device can facilitate the authentication of the first user's account with the application. In particular, the media streaming device can receive a challenge from the application server and transmit it to the first user device. The media streaming device can receive an encrypted challenge response from the user device and transmit it to the application server. The application server can authenticate the user's account using the encrypted challenge response. The application server can then send a transient session token to the media streaming device that enables the media streaming device to deliver application content for the user. The transient session token can further include an expiration parameter that, once triggered, causes the media streaming device to terminate the transient session.

Particular implementations offer at least the following advantages: The media streaming device can prompt a user to open a transient session. Therefore, if the user wants to access application content on someone else's media streaming device, the user can be prompted to open a transient session. Another advantage is that to open the transient session, the media streaming device can facilitate authentication of the user's application account without receiving personal information, such as a username or password. In this sense, once the user leaves, there is no possibility that the user's credentials remain on someone else's media streaming device. Yet another advantage is that the transient session limits access to the user profile and account information. Therefore, even if a user were to step away for a moment, another person could not modify any of the user's settings. Yet even another advantage is that the transient session token includes an expiration parameter. Therefore, even if the user forgets to log out of the transient session, the session terminates based on the expiration parameter.

DETAILED DESCRIPTION

Figure 1:
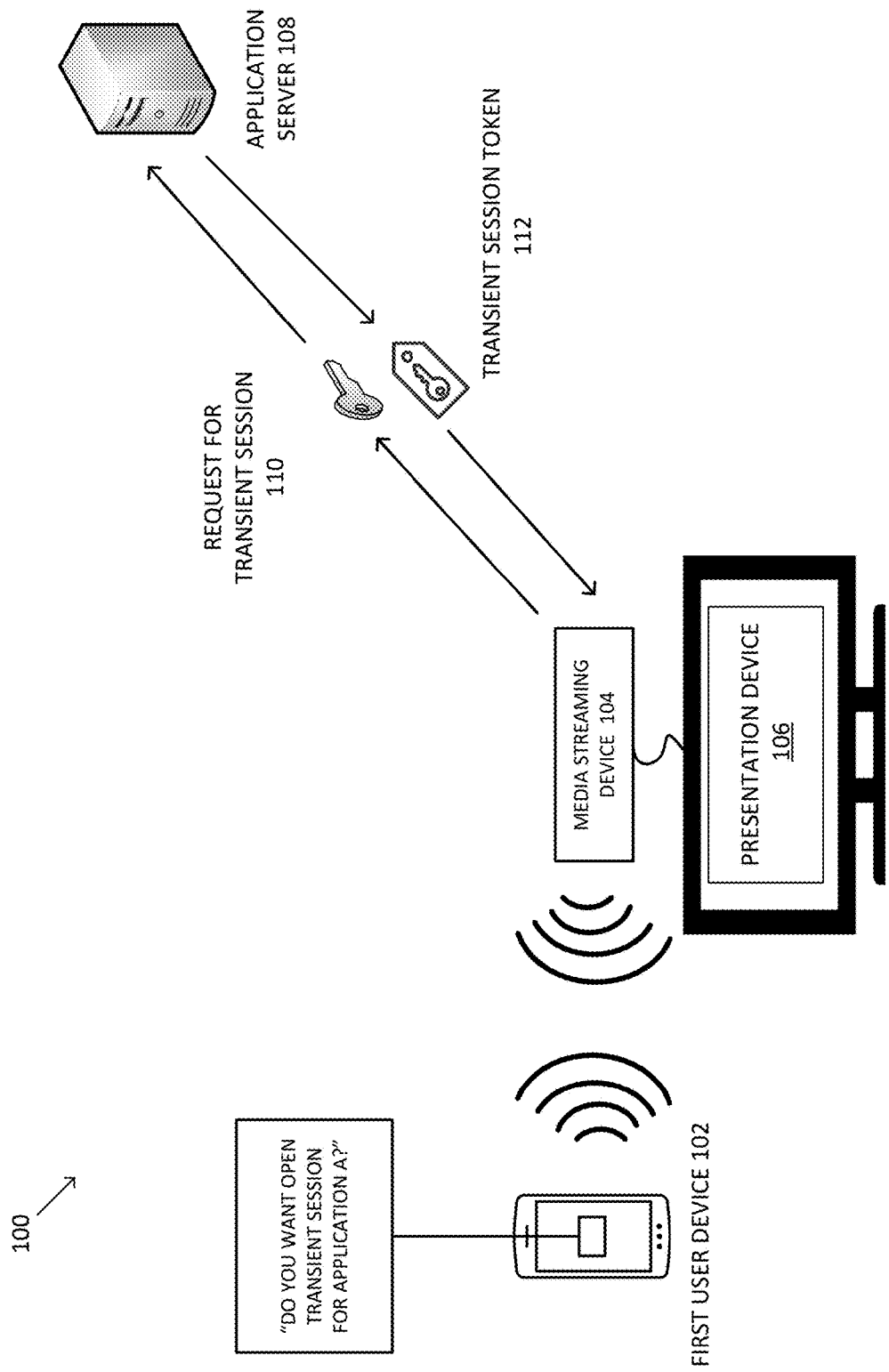
FIG. 1 is a system for effectuating a transient session, according to one or more embodiments.

In the following description, various examples will be described. For the purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the example being described.

Users can use computing devices to access and use software applications via the internet from nearly any location across the globe. In many instances, the computing devices are communal devices that can be shared by more than one user. Users can use these communal devices to access their own application accounts for limited periods of time. For example, in a single hotel room, multiple users can use the hotel's smart television to access their own streaming service content, such as on their individual Netflix®, Spotify®, or HBOMax® account. The general process is for the user to access the application via a client application preloaded onto the computing device. The user then logs in by using their credentials to initialize their streaming service account. One issue that arises is that users forget to log out of their accounts when they leave. In other words, the user leaves their usernames, passwords, and applications exposed to a subsequent and unauthorized user. Not only is this inconvenient, but it can bind the authorized user to the decisions of the unauthorized user. A subsequent unauthorized user's interaction with the application will alter the authorized user's experience. For example, based on the unauthorized user's interaction with an application, the application's recommendations that were tailored to the authorized user's choices will be modified to reflect the unauthorized user's choices. Another issue is that the unauthorized user can cancel, modify or incur charges on the authorized account.

The herein-described embodiments address the above-referenced issues by providing the ability for a user to use open a transient session with a communal device (e.g., a media streaming device) and access their applications (e.g., Netflix®, Amazon Prime®, and Hulu®) without having to provide a username or password for authentication. The user's device can display a request for whether the user would like to access an individual application instance. The user can approve the request via their device (e.g., smartphone) and authenticate their application account via the communal device without providing a username or password. The transient session can be configured to the user's preferences and presented to the user through the communal device. Furthermore, the transient session can be configured to expire without any manual input from the user. In this sense, a user can enjoy a transient session of an application on a communal device without providing any personal information such as their identity, username, and password.

FIG. 1 is a system 100 for effectuating a transient session, according to one or more embodiments. The system 100 includes a user device 102 in operable communication with a media streaming device 104. The user device 102 can be any computing device (e.g., smartphone, tablet, smartwatch) that can connect to a network and can communicate with the media streaming device 104. The user device 102 can further be associated with a first user profile and one or more applications. The first user profile can include, for example, an identifier of the first user and associated with applications for receiving content (Netflix®, Amazon Prime®, Spotify®). The first user can be, for example, a person (e.g., hotel guest, a house guest, or other person that does not own the media streaming device 104) using a media streaming device 104 belonging to someone else (e.g., hotel, friend, Airbnb® host).

The media streaming device 104 can be any computing device (e.g., Apple TV® or Amazon Fire Stick®) that can connect to a network, communicate with an application server 108 of a service provider, and receive content. In some embodiments, the media streaming device 104 can be connected to a presentation device 106, such as a smart television or smart speaker. In other embodiments, the media streaming device 104 can be a presentation device such as a smart television or smart speaker. The media streaming device 104 is operable to detect the user device 102. For example, the media streaming device 104 can be connected to a network such as a local area network (LAN). In the instance that the user device 102 connects to the network, the media streaming device 104 can detect the user device 102. For example, the media streaming device 104 can be connected to a network such as a local area network (LAN) and detect each new device that connects to the network. In response to detecting the user device 102, the media streaming device 104 can determine whether the user device 102 is within a threshold range. The media streaming device 104 can further determine whether the user device 102 is in the same room as the media streaming device based on the range. In particular, the media streaming device 104 can include hardware and software for detecting a range of the user device 102 in relation to the media streaming device 104. For example, the media streaming device 104 can include hardware and software to employ an ultra-wideband (UWB) ranging technique. The UWB technique is described with more particularity with reference to FIG. 3. In response to detecting that the user device 102 and determining that the device is within a threshold range, the media streaming device 104 can initiate a transient session.

The media streaming device 104 can be associated with a second user profile. The second user profile can include a name, a phone number, a room number, or other identifier or combination of identifiers unique to the second user. The second user can be, for example, an owner or operator of the media streaming device 104, such as a hotel, a rental property owner, or other owner or operator of the media streaming device 104. In response to determining that the first user device is within range, the media streaming device 104 can send a message to the user device 102 that includes a request to open a transient session. The request can be received on the user device 102 and displayed on a display of the device. For example, the user device 102 can display a prompt, "Do you want to open a transient session for application A?" Based on a response from the first user, the media streaming device 104 can transmit a request for a transient session 100 to the application server 108. The media streaming device 104 can further transmit the request for the transient session without providing a username or password. The application server 108 can authenticate the first user's account and transmit a transient session token 102. The transient session token can be a set of computer-readable instructions that authenticate the first user's account and include an expiration parameter for terminating the transient session.

The media streaming device 104 can receive the transient session token 112 and initiate a transient session of the application on, for example, the presentation device 106. The first user can begin to watch television or movies on the presentation device 106. The application content can further be personalized by the application server 108 for the first user. For example, if the user was halfway through watching a movie on the application at home, a transient session in a hotel, for example, would retrieve the movie at the halfway point for the first user. Authentication of the first user's account with the application is described in more detail with respect to FIG. 5.

The media streaming device 104 can further cause the transient session to be a limited user experience based on the transient session token. The limited user experience can include providing the first user with application content but removing any functionality from a user interface to add, modify, or delete information from a user profile or account setting. For example, a media streaming device 104 can indicate to Netflix® that the user experience is to be limited via the transient session request. The media streaming device 104 can allow the first user to access movies and television programming but restrict access to a user profile or account setting information. In some embodiments, the application's user interface can be modified for the limited experience. For example, the user interface can be configured to not include links to a user profile or account settings.

The transient session can be a limited session such that the session self-terminates after one or more expiration parameters are triggered. The transient session token 112 can be a conditional authentication and include information instructing the client application to terminate the session upon one or more expiration parameters being triggered. The parameters can include an indication that the first user is no longer accessing the content. Another condition can be that a maximum time limit for using the transient session token 112 has expired.

The media streaming device 104 can determine that the first user is no longer engaging with the application based on various data such as a distance of the user device 102 from the media streaming device 104 and entering into a sleep mode by either the media streaming device 104 or the presentation device 106. The media streaming device 104 can receive various inputs and apply a heuristic algorithm to make the determination. In some embodiments, the determination can be based on a decision tree. The media streaming device 104 can also monitor the transient session for the expiration of a time limit. The time limit can be included in the transient session token 112. For example, the time limit can be four hours from receiving the transient session token 112. At the expiration of the time, the application server 108 can cease to provide content to the media streaming device 104.

Figure 2:
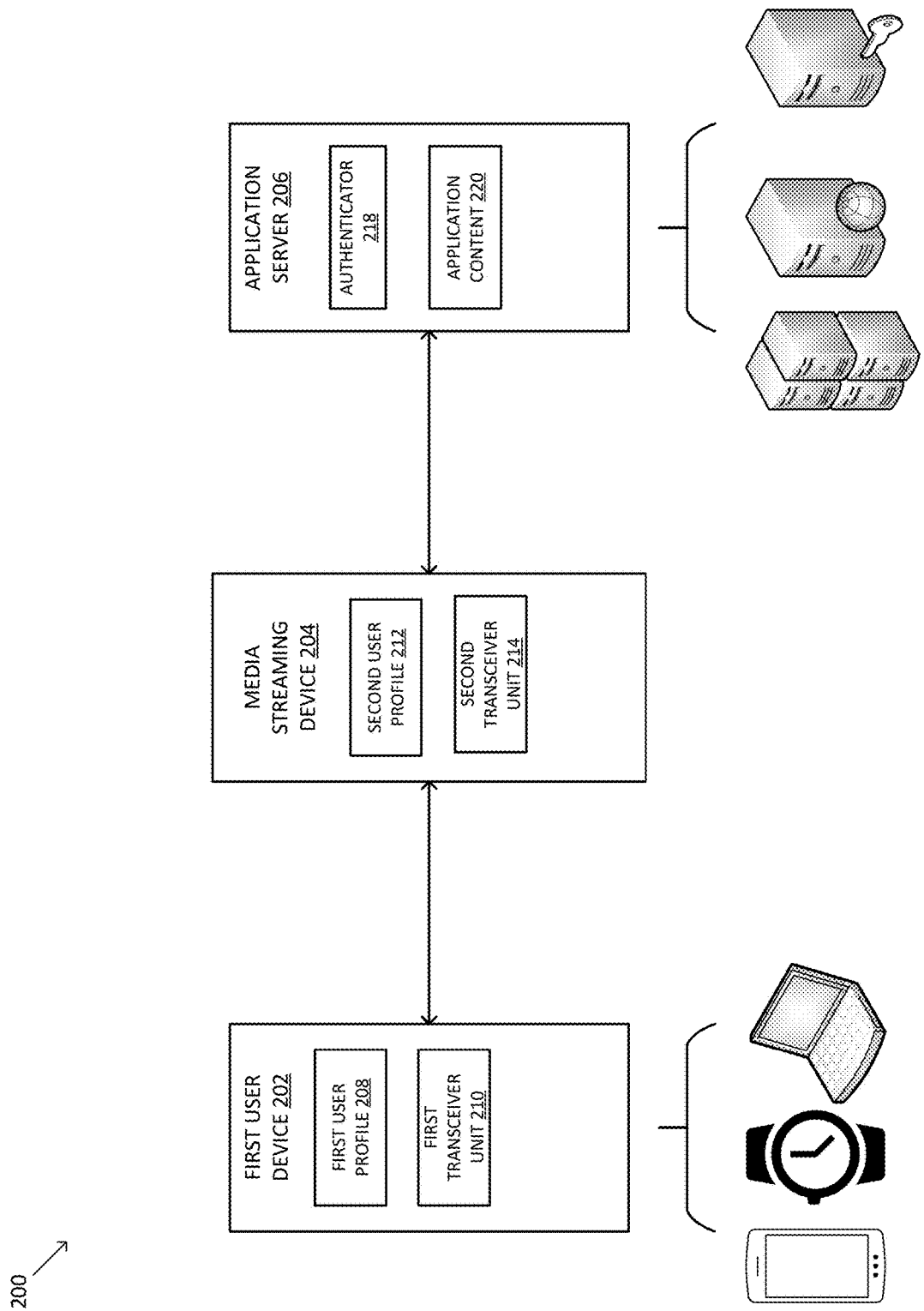
FIG. 2 is a system for effectuating a transient session, according to one or more embodiments.

FIG. 2 is a system 200 for effectuating a transient session, according to one or more embodiments. The system 200 includes a first user device 202 in operable communication with a media streaming device 204. The system 200 further includes an application server 206 in operable communication with the media streaming device 204.

The first user device 202 can be a computing device such as a smartphone or a laptop. The first user device 202 can be associated with a first user profile 208. The first user profile 204 can include first user-specific data associated with the first user's identity. The first user device 202 can further include a first transceiver unit 210. The first transceiver unit 210 can include hardware and software for emitting and receiving a signal, such as a low-energy, short-range, high-bandwidth transmission signal. For example, the first transceiver unit 210 can emit and receive over a UWB transmission protocol.

The media streaming device 204 can be a computing device, such as a laptop, set-top box, hardware dongle, or a smart television. The media streaming device 204 can be associated with a second user profile 212 that includes second user-specific data associated with the second user's identity and user device environment, such as user-specific device configurations. The first user can be different than the second user. Furthermore, the first user can own the first user device 202, and the second user can own the media streaming device 204. For example, the first user can be a vacation property renter, and the second user can be a vacation property owner. In this scenario, the media streaming device can be a television location on the rental property. The media streaming device 204 can further include a second transceiver unit 214. The second transceiver unit 214 can include hardware and software for emitting and receiving a transmission signal. For example, the second transceiver unit 214 can transmit and receive low-energy, short-range, high-bandwidth transmission signal, such as a UWB transmission protocol. The UWB ranging technique is described with more particularity with respect to FIG. 3.

The first user device 202 and the media streaming device 204 can communicate via the first transceiver unit 210 and the second transceiver unit 214. In particular, the media streaming device 204 can determine a range of the first user device 202 via communication between the first transceiver unit 210 and the second transceiver unit 214. In some embodiments, the first transceiver unit 210 and the second transceiver unit 214 can employ a UWB technique and determine a Time of Flight (ToF) of a UWB radio frequency signal between the transceiver units. Based on the ToF, the second transceiver unit 214 can determine a range of the first user device 202.

The ranging functionality enables the first user device 202 and the media streaming device 204 to communicate with the proper device. For example, in a densely packed environment, multiple user devices can be proximate to each other. Each user device can be associated with a different area of the environment. Furthermore, one party associated with one area can inadvertently use a device irrespective of another party associated with a different area. For example, two television sets can be arranged against an adjoining wall of two different rooms. In this scenario, without proper authentication, a person in one hotel room could use their mobile device to access another device that is in another hotel room.

Figure 3:
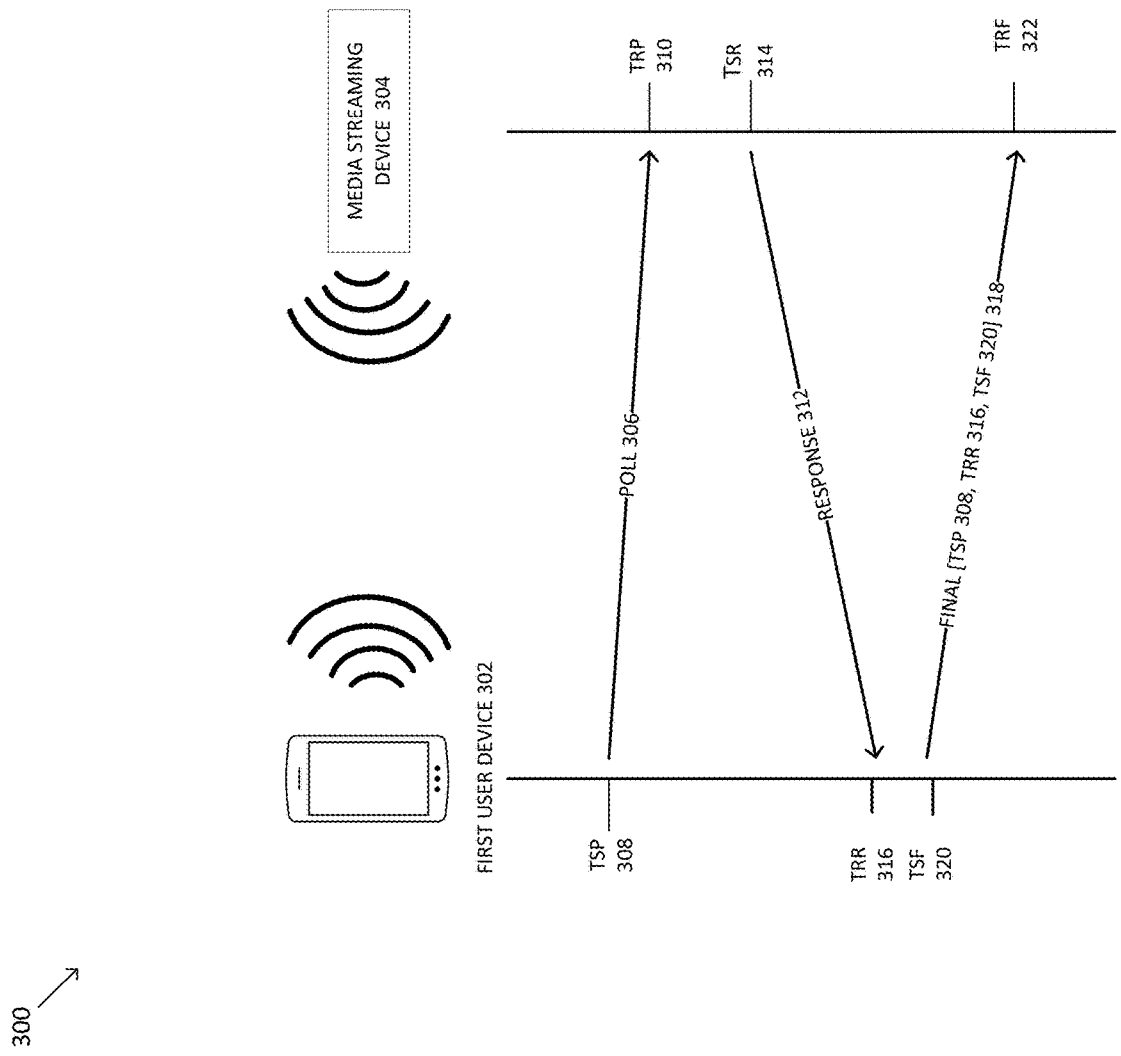
FIG. 3 is a signaling diagram for a ranging technique between a first user device and a media streaming device, according to one or more embodiments.

FIG. 3 is a signaling diagram for a ranging technique 300 between a first user device 302 and a media streaming device 304, according to one or more embodiments. The ranging can be performed by calculating time of flight (ToF) measurements between a first user device 302 and a media streaming device 304. The ToF is calculated by measuring the roundtrip time of data packets transmitted between the devices. While the operations of processes 300, 500, 700, 800, 900, and 1200 are described as being performed by generic computers, it should be understood that any suitable device (e.g., a user device, a server device) may be used to perform one or more operations of these processes. Processes 300, 500, 700, 800, 900, and 1200 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

As illustrated, the first user device 302 can send a poll message 306, for example, via UWB technology, to the media streaming device 304. The first user device 302 can further record the time of sending the poll message (TSP) 308. The media streaming device 304 can receive the poll message 306 and records the time of receiving the poll message (TRP) 310. The media streaming device 304 can then wait for a fixed period, and then send a response message 312 to the first user device 302. The media streaming device 304 can record the time of sending the response message (TSR) 314. The first user device 302 can receive the response message and records the time of receiving the response message (TRR) 316. The first user device 302 can then send a final message 318 to the media streaming device 304 via the UWB. The final message 318 can include the TSP 308, the TRR 316 and the time of sending the final message (TSF) 320. The media streaming device 304 can record the time of receiving the final message (TRF) 322. Based on the recorded and received times, the media streaming device 304 can calculate a distance between the media streaming device 304 and the first user device 302. For example, the second user computing device can calculate a time of flight (ToF) based on the above times. The ToF can be calculated, for example, as ToF=[(TRR 316-TSP 308)−(TSR 314-TRP 310)+(TRF 322-TSR 314)−(TSF 320-TRR 316)]/4. The second computing device 304 can multiply the ToF by the speed of light to determine the distance from the first user device 302.

In some embodiments, the media streaming device 304 can also determine a relative position of the first user device 302 in relation to the media streaming device 304. For example, the media streaming device 304 can employ UWB-based techniques to determine a position of the first user device 302 relative to the media streaming device 304. In some embodiments, the media streaming device 304 can include a third transceiver unit (not shown) and a fourth transceiver unit (not shown) arranged as a transceiver array. The media streaming device 304 can use the third transceiver unit and the fourth transceiver unit to implement various positioning techniques. For example, the media streaming device 304 can receive a signal from the first user device 302 at each transceiver of the transceiver array. The media streaming device 304 can determine an arrival time of the signal at each transceiver of the transceiver array. The media streaming device can then determine an angle of arrival (AoA) or time difference of arrival (TDoA) at each transceiver unit based on the difference in time that each transceiver receives the signal from the first user device 302. Based on the calculations, the media streaming device 304 can determine the relative position of the first user device 302. The range and position of the first user device 302 in relation to the media streaming device 304 is described with more particularity in reference to FIG. 4.

Figure 4:
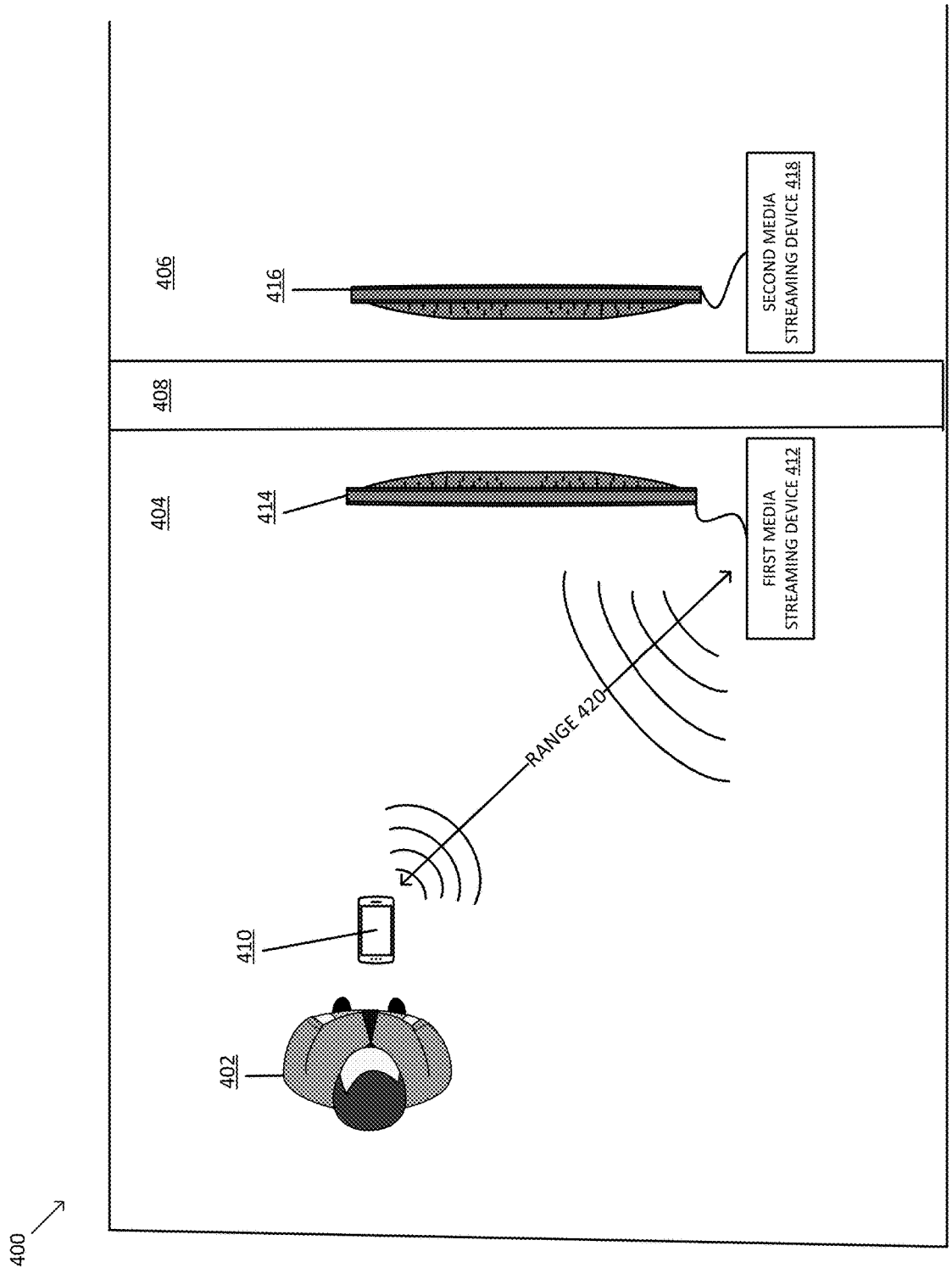
FIG. 4 is a plan view of ranging and positioning in an environment, according to one or more embodiments.

FIG. 4 is a plan view of ranging and positioning in an environment 400 according to one or more embodiments. As illustrated, a first user 402 can be located in the environment 400. The environment 400 can be, for example, a hotel, apartment complex, or a multi-family dwelling, and the first user 402 can be a guest. As illustrated, the first user 402 is in a first room 404, which is separated from a second room 406 by an adjoining wall 408. The first user 402 can have a first user device 410, such as the first user's smartphone, and can communicate with a media streaming device 412. In some embodiments, the first media streaming device 412 is in communication with display device 414, such as a smart television. The media streaming device 412 and the display device 414 can be, for example, owned by a short-term rental property that owns the first room 404.

The first user 402 can access his or her application via the media streaming device 412. For example, the first user 402 can watch content from a streaming service on the display device 414 via the media streaming device 412. The first user 402 can further log on to the application via a transient session token from an application server. The media streaming device 412 can terminate the first user's access to the content based on an expiration parameter included with the transient session token. In this sense, the first user is automatically logged out of the application, and a subsequent renter would have to reestablish authentication using their own credentials to access the application content.

The media streaming device 412 can establish that correct devices are connecting with each other via the above-referenced ranging and positioning techniques. As illustrated, the second room 406 includes another device 414.

The other device 416 can be arranged in the second room 406, and owned by the second user. For example, the second room 406 is another room in the vacation property and the other device 414 is another smart television. In some instances, the second room 406 further includes a second media streaming device 418. As illustrated the media streaming device 412, the display device 414, the other device 416, and the second media streaming device 418 are abutted against the same adjoining wall 408. Furthermore, a signal from the first user device 410 can conceivably breach the adjoining wall 408 and reach the other device 414 or second media streaming device 418. Conversely, a person in the second room 406 could have a device that transmits a signal that breaches the adjoining wall 408 and reaches the media streaming device 412. Therefore, the first media streaming device 412 can determine that it is connecting with a device in the first room 404.

For illustration purposes, a range 420 is shown between the first user device 410 and the media streaming device 412. The range 420 is the distance between the two devices as determined by the first media streaming device 412. It should be appreciated that in situations in which the presentation device 414 includes the functionality of the first media streaming device 412, the range 420 can be the distance between the first user device 410 and the presentation device 414.

The first user device 402 and the first media streaming device 412 can use various ranging techniques to determine a distance between the first user device 402 and the media streaming device 410. For example, the first user device 402 and the first media streaming device 412 can engage in UWB ranging. The first user device 402 can transmit a poll message to the media streaming device 412. The first media streaming device 412 can send a response message back to the first user device. The first user device 402 can then send a final message back to the first media streaming device 412. The final message can include transmission times for the poll message, receipt time for the response message, and the transmission time of the final message. The first media streaming device 412 can use the final message times along with a receipt time of the poll message, a transmission time of the response message, and a receipt time of the final message to determine a distance from the first user device 402.

The first media streaming device 412 can compare the calculated distance to a threshold distance. The first media streaming device 412 can then determine a likelihood that the first user device 410 is in the first room 404, based on the comparison. For example, if the calculated distance is less than the threshold distance, the first media streaming device 412 can conclude that the first user device 410 is in the first room 404. If, however, the calculated distance is greater than the threshold distance, the first media streaming device 412 can conclude that the first user device 410 is not in the first room 404. For example, the first user device 410 may be in the second room 406, and the signal is carrying through the adjoining wall 408.

The first media streaming device 412 can further determine a relative position of the first user device 410. As illustrated, the first person 402 and the first user device 410 are positioned to the left of the first media streaming device 412. It should be appreciated that the first person 402 could be positioned anywhere around the first media streaming device 412 including behind the device and has been positioned to the left for illustration only. The first media streaming device 412 can apply various positioning techniques to determine a relative position of the first user device 410. For example, the first media streaming device 412 can employ a Time Difference of Arrival technique (TDoA). The media streaming device 412 can employ three or more transceiver devices that each has a synchronized clock. The first user device 410 can transmit a positioning signal to the first media streaming device 412. Each transceiver of the first media streaming device 412 can detect a time stamp for receiving the positioning signal. The first media streaming device 412 can then calculate the difference in arrival times at each transceiver. The first media streaming device 412 can further use those values as inputs for a multilateration algorithm to determine a position of the first user device 410.

The first media streaming device 412 can then use either the ranging and positioning individually or in combination to determine whether the first user 402 intends to receive content on the display device 414, and is not, for example, someone in the second room 406. In other embodiments, the first media streaming device 412 can perform other verification techniques, such as display a QR code display device 414 that the first user device 410 scans. In other embodiments, the first media streaming device 412 can cause a pin or QR code to appear on the display device 414. The first user 402 can be required to enter the pin into the first user device 410 or scan the QR code.

Figure 5:
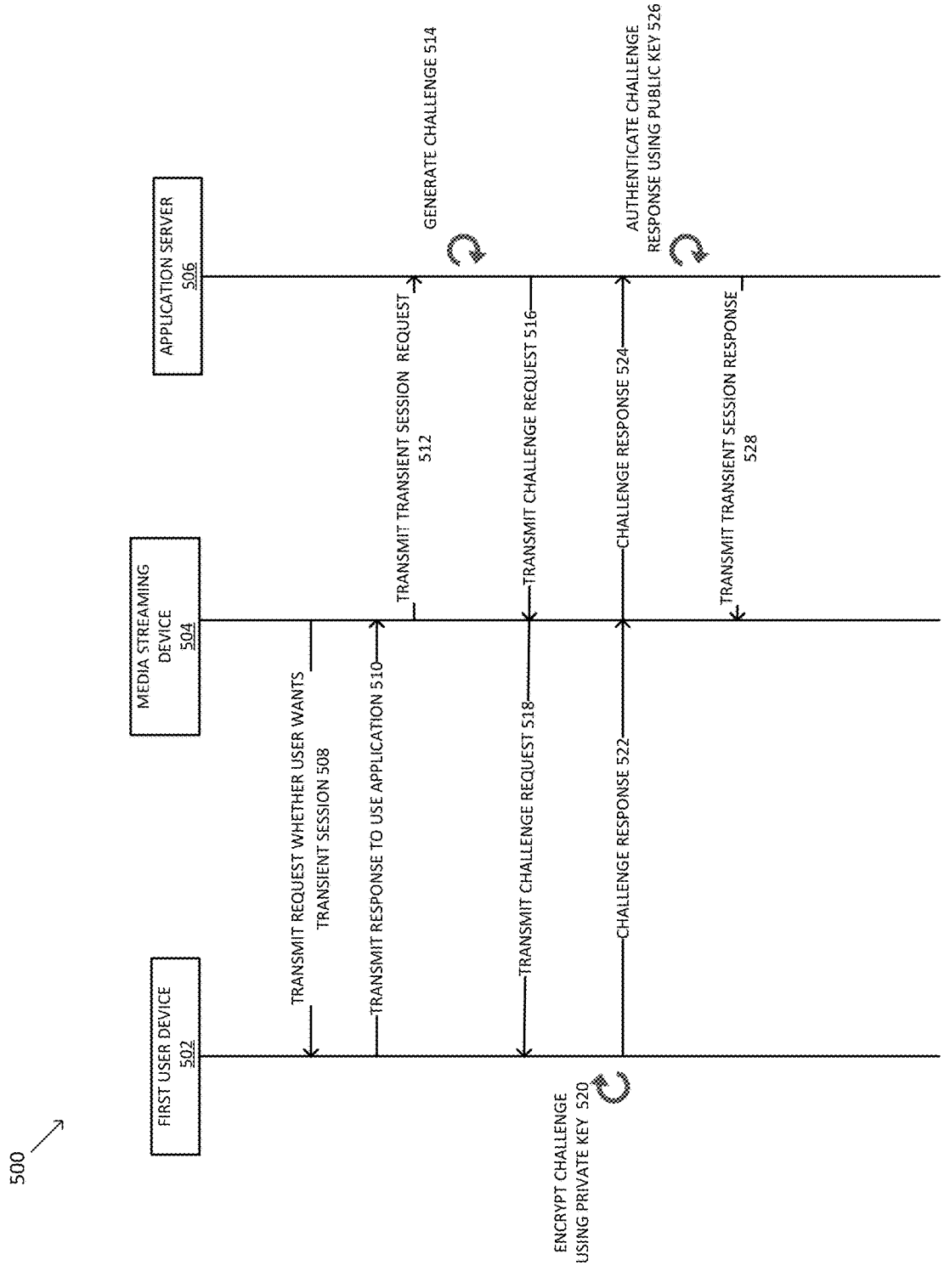
FIG. 5 is a signaling diagram for initiating a transient session between a media streaming device and an application server, according to one or more embodiments.

FIG. 5 is a signaling diagram 500 for initiating a transient session between a media streaming device 502 and an application server 504, according to one or more embodiments. It should be appreciated that in this diagram, the first user device 502 and the media streaming device 502 have established a secure connection and media streaming device can relay messages to facilitate authentication of a user account. At 508, the media streaming device 504 can transmit a request to the first user device 502 as to whether the first user wants a transient session of the application. For example, a first user can receive a prompt on the first user device 502 as to whether they want transient access to Netflix®. At 510, the first user can transmit a response as to whether they want transient access to the application via the first user device 502.

At 512, in response to receiving an indication that the first user wants transient access to the application, the media streaming device 504 can transmit a request for a transient session to an application server 506. At 514, in response to receiving the request for a transient session, the application server 506 can generate a challenge. The challenge can be a number, such as a random 16-byte number. At 516, the application server 506 can transmit a challenge request, including the challenge to the media streaming device 504. At 518, the media streaming device 504 can transmit the challenge request to the first user device 502.

At 520, the first user device 502 can encrypt the challenge using a private key, such as a cryptographic hash. It should be appreciated that prior to this request for transient access to the application, the first user established an account with the application. The first user created a public key and a private key and shared the public key with the application server 506. The first user retains the private key and uses it to encrypt the challenge. At 522, the first user device transmits a challenge response, including the encrypted challenge to the media streaming device 504. At 524, the media streaming device 504 transmits the encrypted challenge to the application server 506.

At 526, the application server 506 authenticates the challenge response. For example, the application server 506 decrypts the encrypted challenge using the public key. The application server 506 then compares the decrypted challenge with the challenge generated at 514.

At 528, the application server 506 transmits a limited authentication success or failure message to the media streaming device 504. If the decrypted challenge matches the generated challenge, the application server 506 transmits a transient session token to the media streaming device 504. If, however, the decrypted challenge does not match the generated challenge, the application server 506 transmits a login failure message to the media streaming device 504.

The transient session token can include expiration parameters for terminating the transient session. For example, the transient session token can include a time limit for a client application executing on the media streaming device to terminate the transient session. The transient session token can further include instructions to terminate the transient session based on an indication that the first user is no longer accessing the application content.

Figure 6:
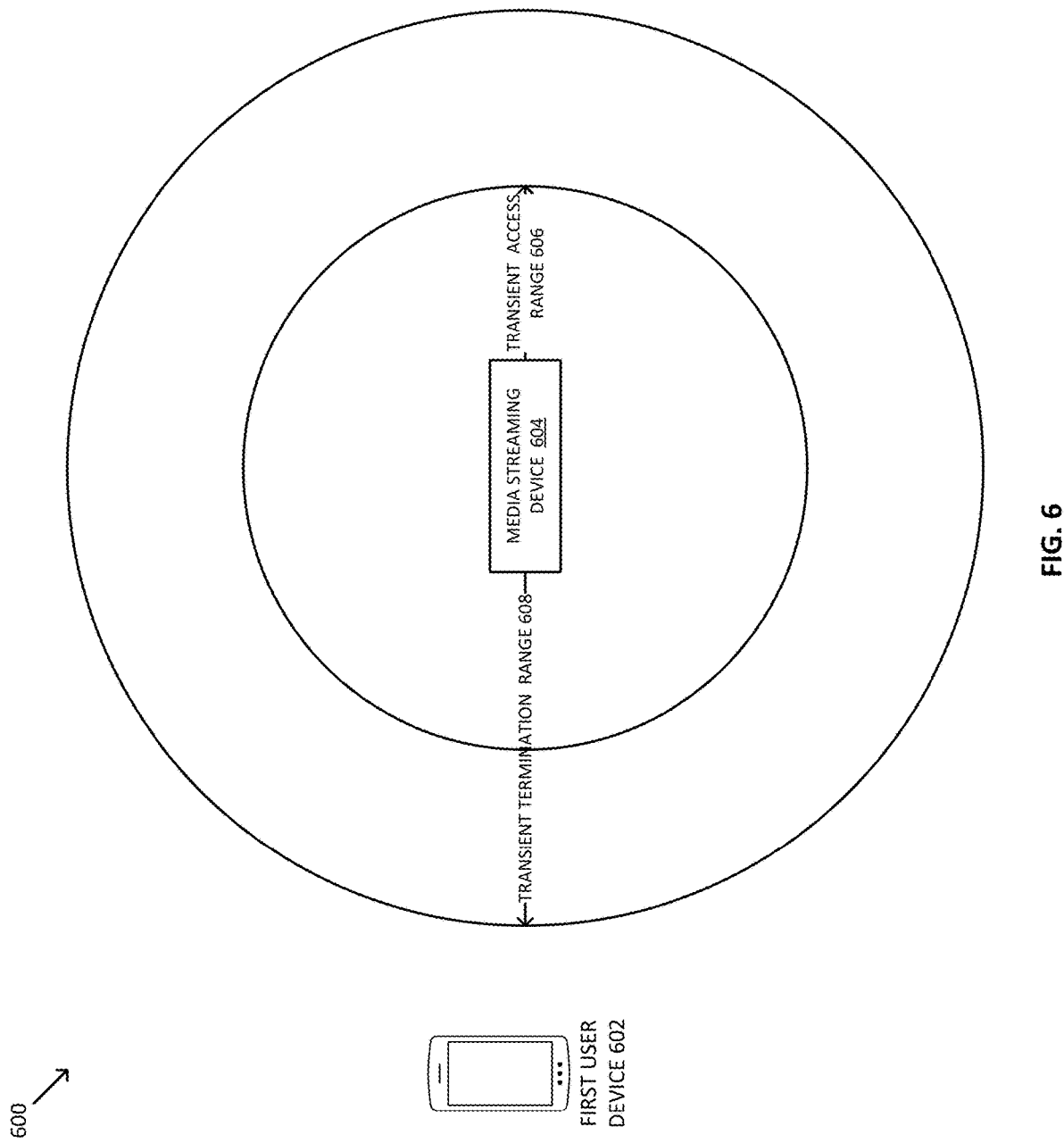
FIG. 6 is an illustration of an initiation of a transient session, according to one or more embodiments.

FIG. 6 is an illustration 600 of an initiation of a transient session, according to one or more embodiments. As seen, a first user device 602 can communicate with a media streaming device 604. As described above, the first user device 602 can pair with the media streaming device 604 to establish a secure connection. As further described above, the media streaming device 604 can engage in various ranging techniques to determine a distance from the first user device 602. The transient access range 606 can be a distance surrounding the media streaming device 604, such that to establish the secure connection, the first user device 606 is within the transient access range 606. The transient access range 606 can be a range within the transmission range of the media streaming device 604.

The transient termination range 608 can be a range greater than the limited authentication login in range 606. The transient termination range 608 can be such that the media streaming device 604 will maintain a transient session as long as the first user device 602 is within the transient termination range 608, which includes the area covered by the transient access range 606.

It is foreseeable that from time to time, a first user may need to step away from the media streaming device 604 without wanting to terminate the transient session. For example, the media streaming device 604 can be located in a first area covered by the transient access range 606, while the transient termination range 608 can cover a larger second area. The first user may need to go outside the perimeter of the transient termination range 608, and not want an interruption of the application service. For example, the media streaming device 604 can be in a family room of a house, which is covered by the transient access range 606, and the house can be covered by the transient termination range 608. The first user can be a family member that needs to, for example, walk out to get the mail outside of the house and consequently outside of the transient termination range 608.

In response to detecting that the first user is outside of the transient termination range 608, the media streaming device can determine whether to terminate a transient session. The detection can be based on a notification from a geolocation service that detects the first user device's position. In other words, the media streaming device can determine that the first user device 602 is outside of the transient termination range 608 without using the above reference ranging and positioning techniques. The media streaming device 608 can terminate the transient session based on one or more additional heuristic factors that the first user wants to terminate a transient session. For example, the media streaming device 604 can send a prompt to the first user, via the first user device 602 as to whether to terminate the transient session. In another example, the media streaming device 604 can terminate the transient session based on a time period that the first user device 602 is outside of the transient termination range 608. In yet another example, the first user device 602 can, based on a geolocation service, detect that it is located in a location suggesting the first user wants to terminate the transient session (e.g., a restaurant). For example, the first user can stay at a hotel and establish a transient session using a media streaming device 604 supplied by the hotel. At some point, the first user can leave the hotel room without manually terminating the transient session. The first user device 602 can, based on geolocation services, detect that it has been moved from the hotel room and into a location that suggests the first user wants to terminate the session (e.g., a restaurant, movie theatre, entertainment venue). The first user device 602 can notify the media streaming device 604. Based on the notification, the media streaming device 604 can terminate the transient session.

The media streaming device 604 can detect that the first user device 602 is outside of the transient termination range 608 using various techniques. In particular, the media streaming device 604 can determine that the first user device is outside of the transient termination range 608 with or without the above-described ranging techniques. The media streaming device 602 can directly or indirectly communicate with the first user device 602 using various transmission protocols such as Wi-Fi or cellular. The first user device 602 can further include geolocation-enabling hardware and software. For example, the first user device 602 can connect to a service that provides the transient termination range 608. The first user device 602 can further determine its location and calculate a distance from the media streaming device 604. The first user device 602 can then notify the media streaming device 604 that it is outside of the transient termination range 608. Based on the notification, the media streaming device 604 can discontinue the transient session as described above.

Figure 7:
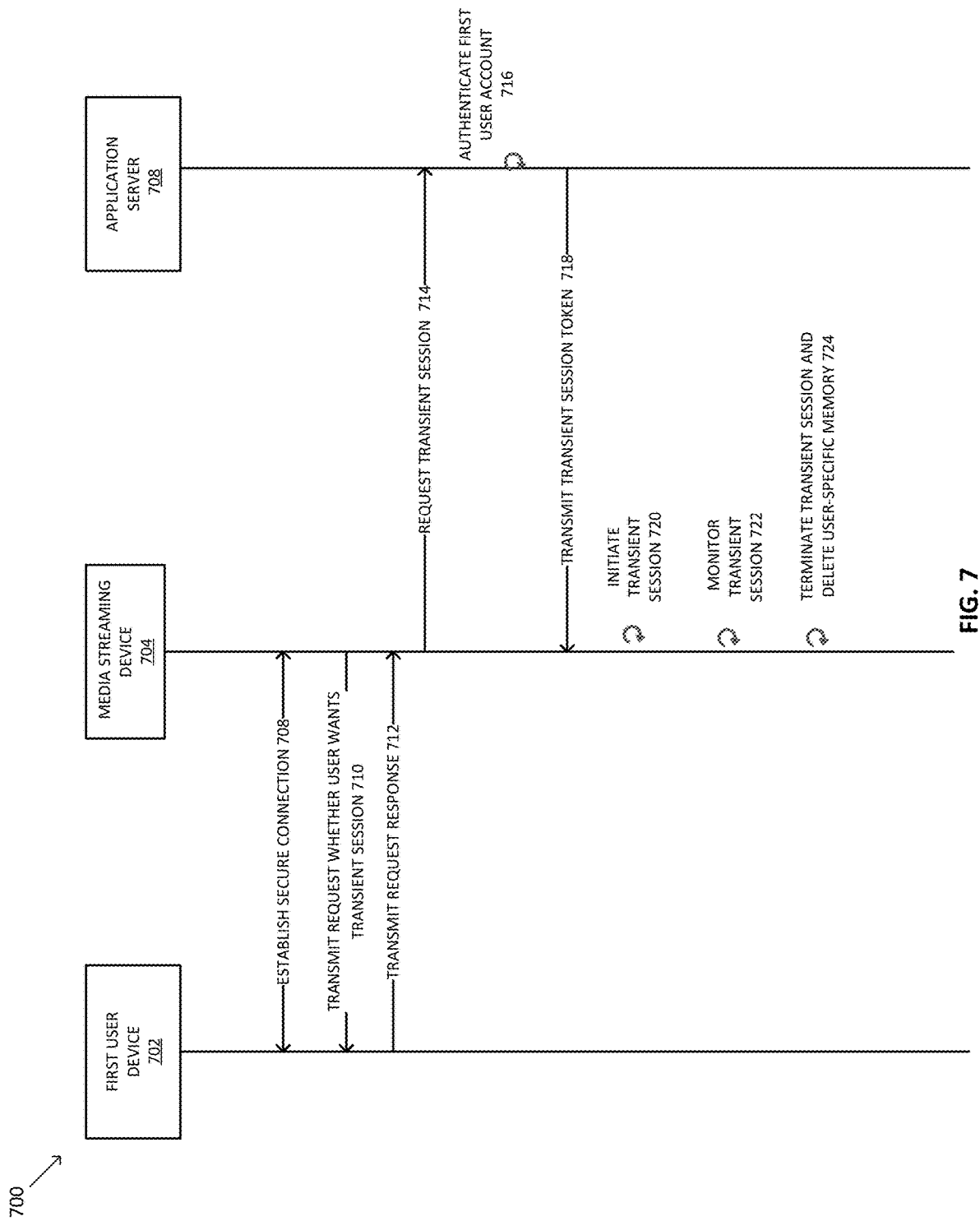
FIG. 7 is a signaling diagram for a process for establishing a transient session, according to one or more embodiments.

FIG. 7 is a signaling diagram for a process 700 for establishing a transient session according to one or more embodiments. As illustrated, a first user device 702 can be in communication with a media streaming device 704 and an application server 706. At 708, the first user device 702 and the media streaming device 704 can establish a secure connection. For example, the media streaming device 704 can use a ranging technique to determine that the first user device 702 is within a threshold range of the media streaming device 704. Based on the range, the media streaming device 704 can establish a secure connection with the first user device 702.

At 710, the media streaming device 704 can transmit a prompt to the first user device 702 as to whether the first user wants to access an application. The media streaming device 704 can then send a prompt to the first user device 702 as to whether the first user wants to initiate a transient session with the application. The prompt can be, for example, a question displayed on the first user device 702, such as "Do you want to open a transient session of Spotify®?" The prompt can further allow the first user to enter a response such as "Yes" or "No." At 712 the first user device 702 can transmit the response to the media streaming device 704.

At 714, the media streaming device 704 can transmit a request for a transient session to the application server 706, based on the response. At 716, the application server can authenticate the first user's application account. For example, the authentication process can be as described with respect to FIG. 5. It should be appreciated that the authentication can occur without the first user providing the media streaming device 704 with a username or password of the first user.

At 718, the application server 708 can transmit a transient session token to the media streaming device 704. The transient session token can be different than a general authentication token in that it can provide conditional authentication. For example, the transient session can be for a limited period of time or based on the first user being within a range of the media streaming device. The transient session token does operate similarly to a general authentication token in that the application content is personalized based on the past use of the first user. For example, if the first user had previously shut down an application (e.g., turned off their television at home) while in the middle of an episode of a television show, the application instance in the transient session will present the episode of the television show at the point that the first initially stopped.

At 720, the media streaming device 704 can initiate a transient session. At this point, the first user can consume the application content. For example, the media streaming device 704 can initiate a Hulu® instance on a connected television, and the first user can start watching their shows. At 722, the media streaming device 704 can monitor the transient session for any conditions that would terminate the transient session. These conditions include a time expiration for the transient session or the first user device 702 being greater than a threshold distance away.

It should further be appreciated that from time to time, the media streaming device 704 can be in an awake mode and at other times in a sleep mode. For example, the first user can pause an application for a threshold period of time that causes the media streaming device to enter a sleep mode. If the media streaming device 704 switches from sleep mode to awake mode, it can verify that the first user is within the transient access range of the media streaming device 704. The media streaming device 704 can employ a ranging technique and authenticate the first user device 702 as described with respect to FIG. 3 above. If the media streaming device 704 determines that the first user device 704 is within the transient access range, it can send a prompt to the first user device 702 as to whether the first user wants a transient session. If, however, the media streaming device 704 determines that the first user device 704 is not within the transient access range, it can delete any stored user-specific data as described with respect to 724.

At 724, the media streaming device 704 can terminate a transient session and delete user-specific memory. For example, at some point, the first user is going to leave the transient termination range for an extended period of time, the maximum time limit for the transient session token is going to expire, the first user is not going to request reauthentication, or some other condition triggers the termination of the transient session. At this point, the media streaming device 704 can terminate the transient session and delete any user-specific memory, such as user personalization data or user inputs stored in memory.

Figure 8:
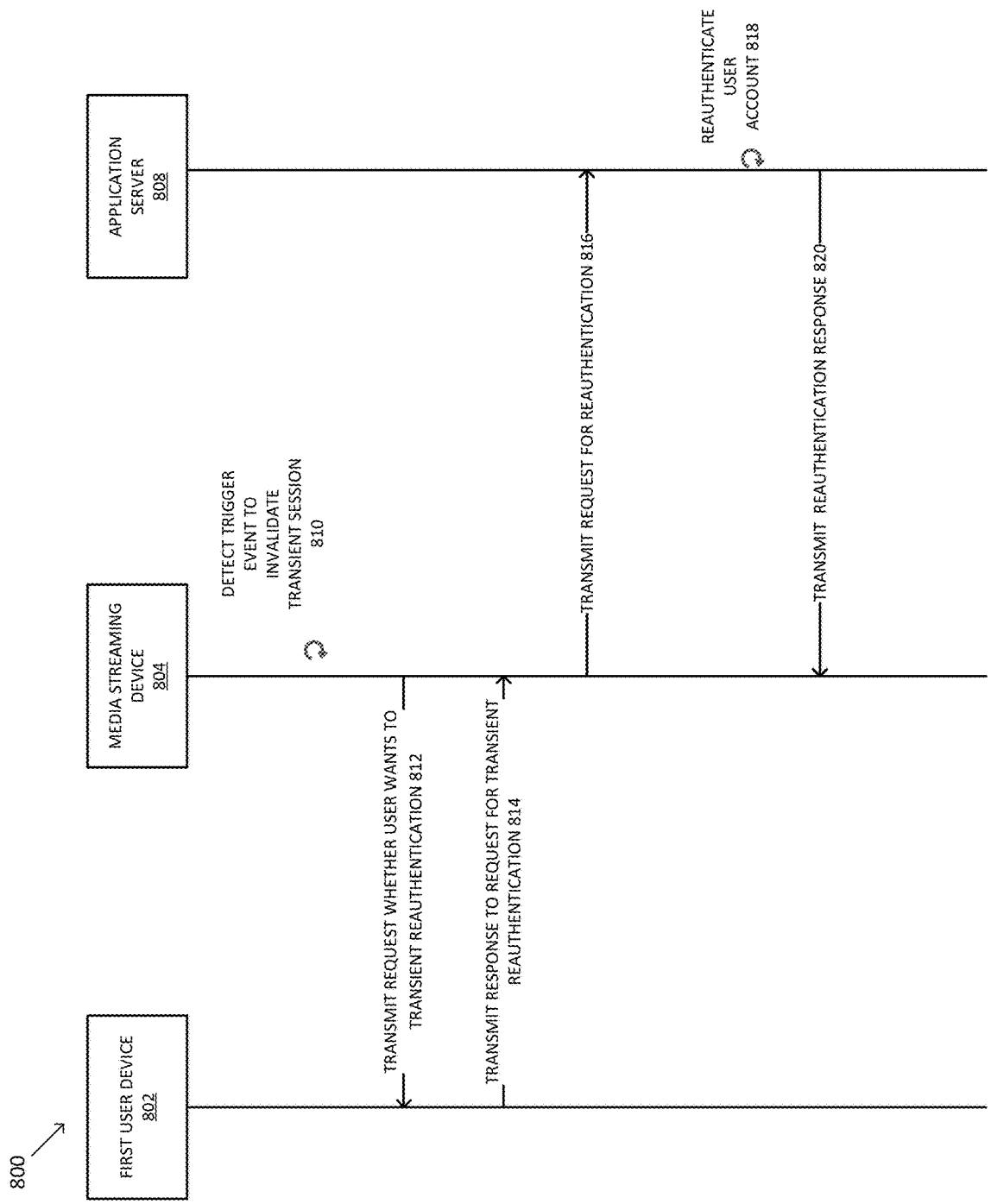
FIG. 8 is a signaling diagram for a process for reauthenticating a transient session, according to one or more embodiments.

FIG. 8 is a signaling diagram for a process 800 for reauthenticating a transient session, according to one or more embodiments. As illustrated, a first user device 802 is in communication with a media streaming device 804 and an application server 808. At 810, the media streaming device 804 can detect a trigger event for an expiration parameter to invalidate a transient session. The trigger event can be, for example, an expiration of a maximum time limit of a transient session token or entering an awake mode after being in sleep mode.

At 812, the media streaming device can transmit a request as to whether the first user wants a transient reauthentication. As described above, the request can be a prompt presented by the first user device 802, such as a question, "Do you want to open a transient session on HBOMax®?" At 814, the first user device 802 can transmit a response of the first user to the media streaming device 804.

At 816, the media streaming device 804 can transmit a request for reauthentication to the application server 808. The request for reauthentication can be the same as a request for authentication but initiated based on a trigger event. The 818, the application server can reauthenticate the first user device 802. In some embodiments, the application server 808 can reauthenticate the first user device 802 as described with respect to FIG. 5.

At 820, the application server can transmit a response to the request for reauthentication response. If the application server 808 successfully reauthenticates the first user's account, the application server transmits a transient session token to the media streaming device 804. If, however, the application server 808 cannot authenticate the first user's account, it sends a login failure message to the media streaming device 804.

Figure 9:
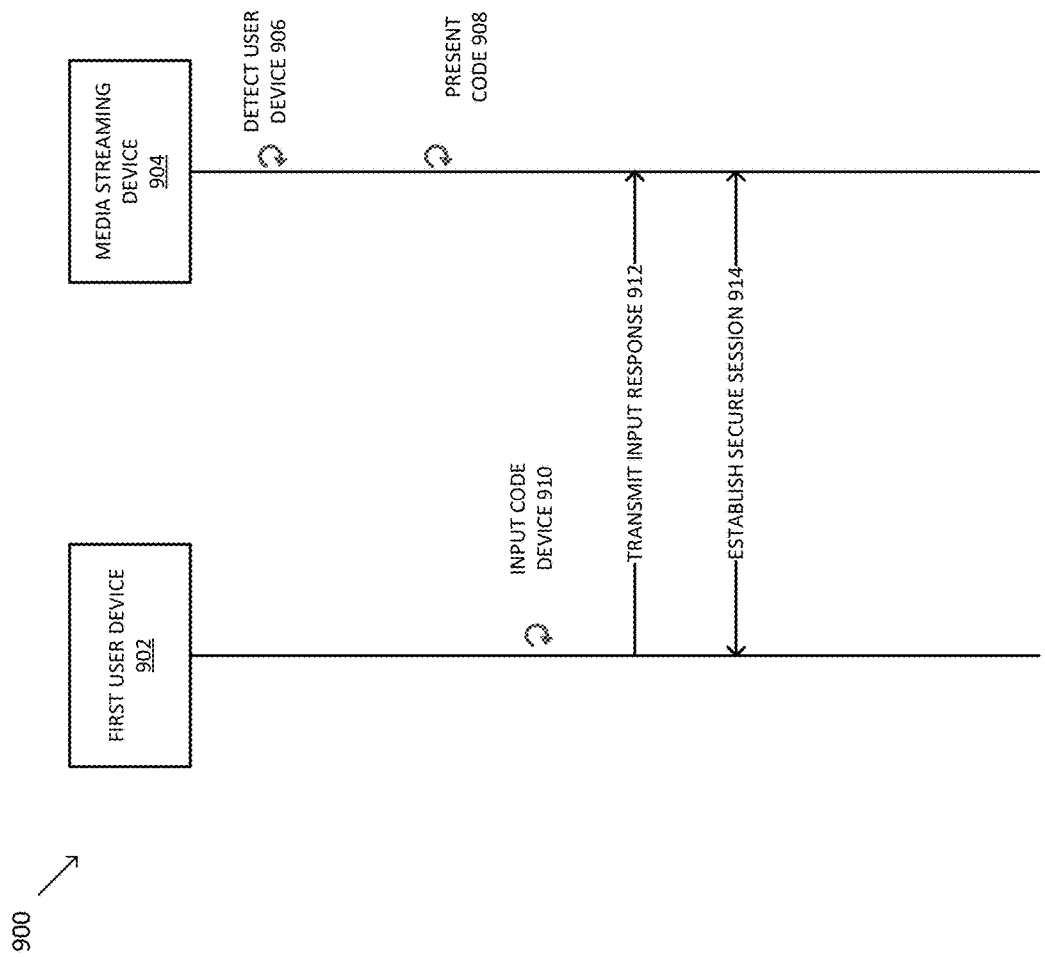
FIG. 9 is a signaling diagram for a process for initiating a transient session between a first user device and a media streaming device, according to one or more embodiments.

FIG. 9 is a signaling diagram for a process 900 for initiating a transient session between a first user device 902 and a media streaming device 904, according to one or more embodiments. It should be appreciated that in some instances, the first user device 902 and the media streaming device operate via different operating systems. Therefore, an alternative for establishing a secure connection is provided. At 906, the media streaming device 906 can detect the first user device 902. For example, the media streaming device 906 can be connected to a network, such as a local area network (LAN). Each time that a new device connects to the network, each other device on the network can be notified of the new device.

At 908, the media streaming device can present a code. The code can be, for example, a quick response (QR) code or a pin. The code can be presented, for example, on a display device such as a smart television connected to the media streaming device 904.

At 910, the first user device 902 can input the code. For example, the first user can manually input the pin into the first user device 902. In another embodiment, the first user can scan the QR code via the first user device 902.

At 912, the first user device 912 can transmit an input response to the media streaming device 904. The input response can be verification that the displayed code is the same as the inputted code.

At 914, the media streaming device can establish a secure connection with the first user device 914. The secure connection can be used by the first user device 902 and the media streaming device 904 to initiate a transient session.

Figure 10:
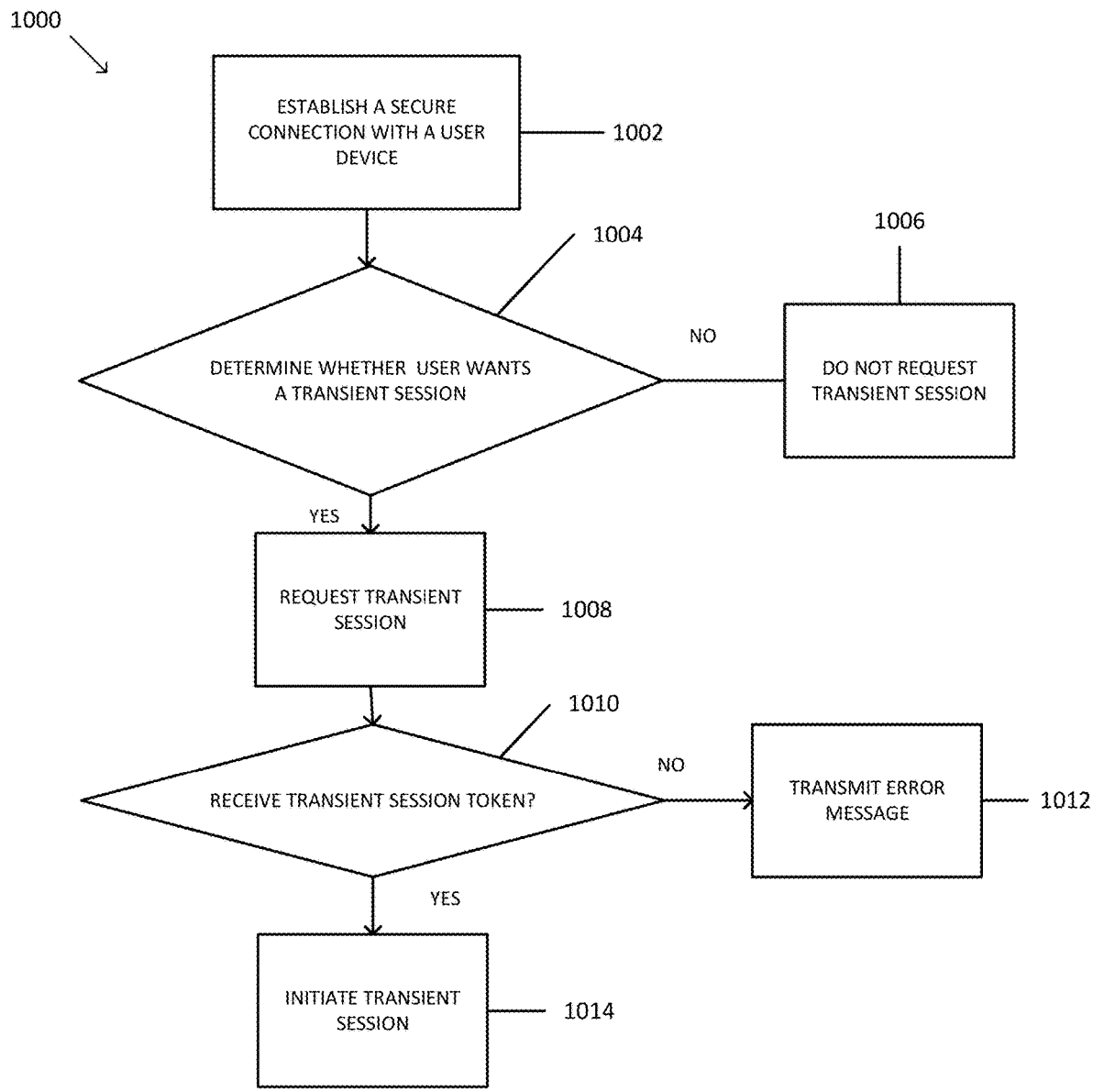
FIG. 10 is a process flow for initiating a transient session, according to one or more embodiments.

FIG. 10 is a process flow 1000 for initiating a transient session, according to one or more embodiments. At 1002, a computing device can establish a secure connection with a user device. The computing device can be, for example, a media streaming device. The computing device can establish the secure connection based on the computing device implementing a ranging technique to detect a distance between the computing device and the user device. The computing device can then compare the distance to a threshold distance. If the distance is less than the threshold distance, the computing device can determine to initiate a secure connection with the user device. If, however, the distance is greater than the threshold distance, the computing device can elect not to initiate a secure connection with the user device.

At 1004, the computing device determines whether a user wants to initiate a transient session. For example, the computing device can transmit instructions to the user device to display a prompt asking a first user whether they want to start a transient session of an application. If the user does not want to initiate a transient session, the process 1000 proceeds to 1006 and does not request a transient session.

If, however, the user does wish to initiate a transient session, the process 1000 proceeds to 1008. At 1008, the computing device can request a transient session for the user account from an application server. The transient session can differ from a standard session in that it can be conditional and self-terminate without any termination input from the user (e.g., turning the computing device off, logging out of the application). The request for the transient session can be included in a computer-readable message. The computer-readable message can include a bit-field that indicates whether the authentication is a normal authentication or a transient authenticating. The user device, computing device, and the application server can exchange information to effectuate the transient session. In some embodiments, the user device, computing device, and the application server can exchange information such that the user device does not provide a username or password to the computing device. For example, as described with respect to Figure above, the application server can authenticate the user's account without receiving a username or password from the user. In this sense, the user's username and password are never stored on the computing device, providing an additional layer of privacy security for the user.

At 1010, the computing device can either receive a transient session token or not receive a transient session token from the application server. If the computing device does not receive a transient session token, the process 1000 proceeds to 1012. At 1012, the computing device can present an error message to the first user device.

If, however, the computing device receives a transient session token, the process 1000 proceeds to 1014. At 1014, the computing device can initiate a transient session. In some embodiments, the computing device provides the transient session token to a client application executing on the computing device. The transient session token provides an indication to the client application to limit the application. For example, the client application can still present application content, but restrict the manipulation of a user profile or account settings.

Figure 11:
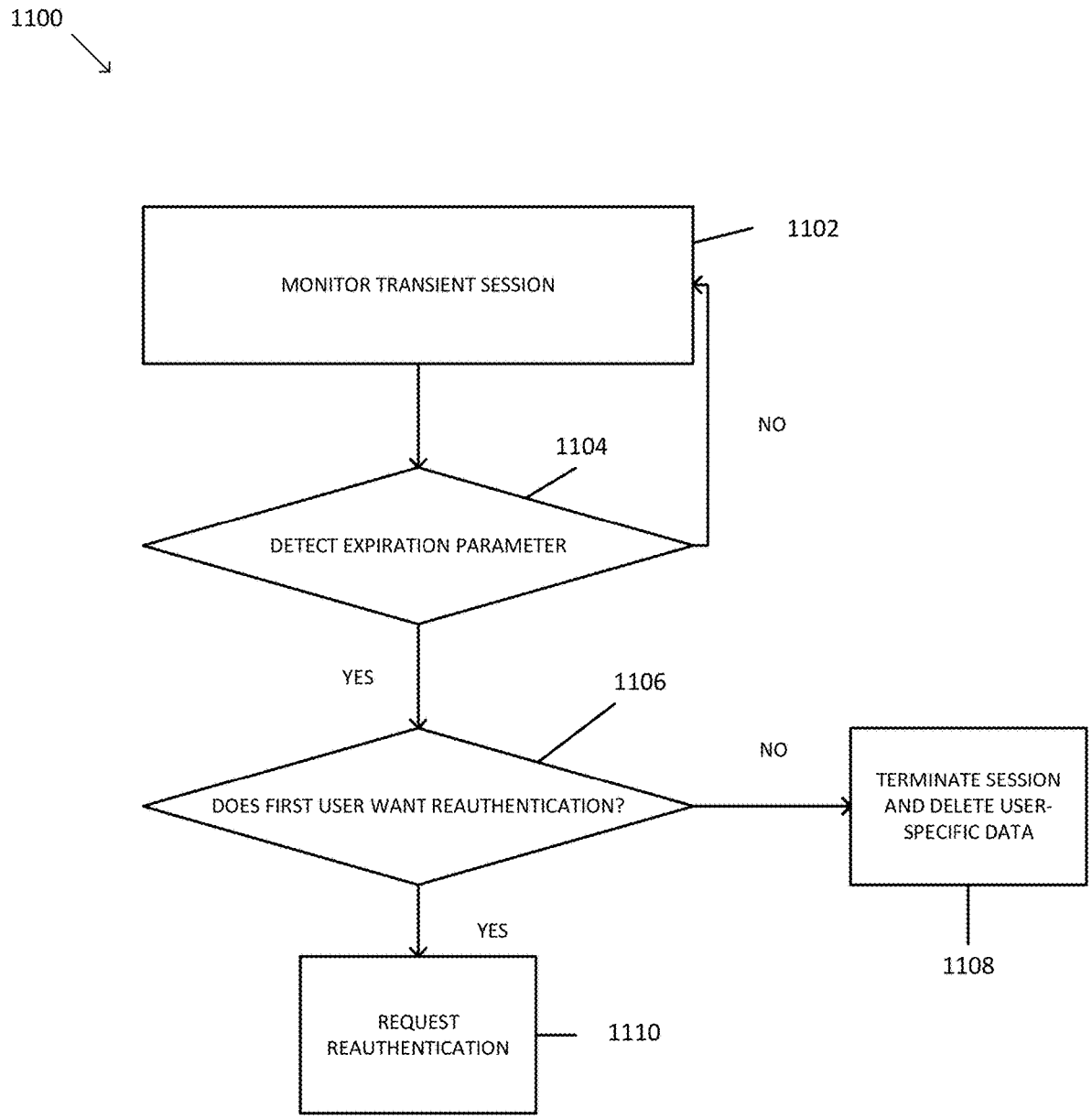
FIG. 11 is a process flow for requesting reauthentication, according to one or more embodiments

FIG. 11 is a process flow 1100 for requesting reauthentication, according to one or more embodiments. At 1102, a computing device can monitor a transient session. The computing device can be a media streaming device, and the transient session can be facilitated by a client application executing on the computing device. The transient session can be conditional and terminates upon one or more conditions being reached. The conditions can include a determination by the media streaming device that a user is no longer engaging with the transient session or a time limit for the transient session has expired. The conditions can be provided by an application server via a transient session token.

At 1104, the computing device can determine that one or more termination conditions have been reached. For example, the computing device can determine that a time limit for the transient session has expired. Another condition can be a determination that a user is no longer engaging in a transient session. This determination can be based on various parameters. For example, the computing device can enter a sleep mode. In another example, the computing device can receive an indication from a user device associated with the user that the user has moved outside the transient termination range. Furthermore, the user has moved outside the transient termination range for a period of time greater than a threshold period of time.

If the computing device is monitoring the transient session and does not detect a termination condition, the process 1100 returns to 1102. If, however, the computing device does detect a termination condition, the process 1100 proceeds to 1106. At 1106, the computing device can determine whether the user wants to initiate a reauthentication of the user's account for another transient session. The computing device can transmit a computer-readable instructions to the user device to present a message to the first user. The message can include a prompt asking the user whether they want to reauthenticate the user's account. If the user does not wish to reauthenticate the user account, the process 1100 proceeds to 1108. At 1108, the computing device can terminate the transient session, including deleting a user-specific data from the computing device. The user-specific data can include any cached user preferences, content selections, and communication logs between the computing device and a client application.

If, however, the user indicates that they do want to reauthenticate the user account, the process 1100 proceeds to 1110. At 1110, the computing device can attempt to reauthenticate the user account. The reauthentication process can be the same as the authentication process. In particular, the reauthentication process can be as described with respect to FIG. 5. Once the user account is reauthenticated, the user can continue to enjoy application content via a transient session.

Figure 12:
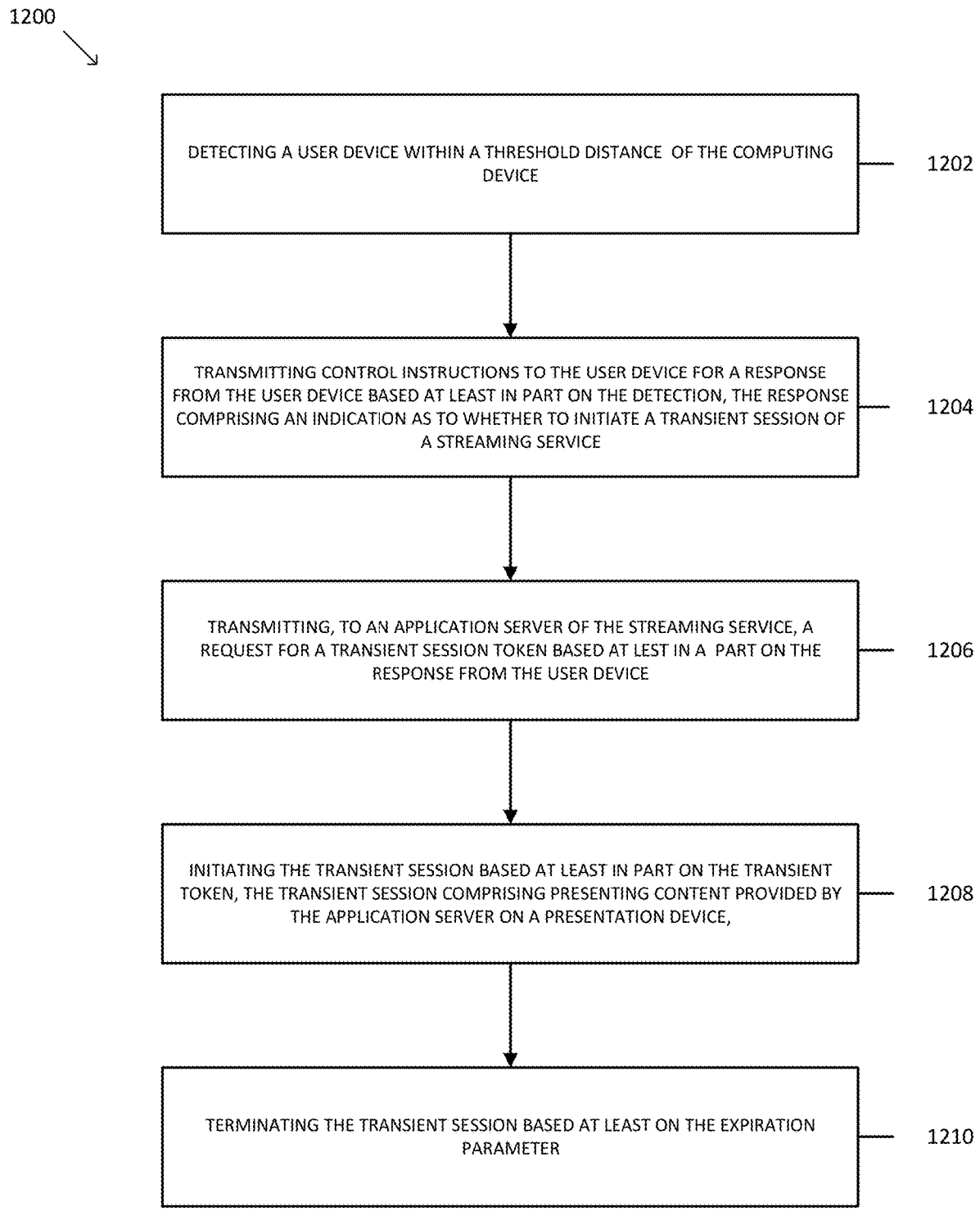
FIG. 12 is a process flow for initiating a transient session, according to one or more embodiments.

FIG. 12 is a process flow 1200 for initiating a transient session, according to one or more embodiments. At 1202, the method can include the computing device detecting a user device within a threshold distance of the computing device. For example, a user can rent a hotel room and upon entering, a computing device (e.g., media streaming device) in the room can detect the user's device (e.g., smart phone). The detection can be based on a short range detection technology such as a UWB detection technique. Based on the detection, the user device and the media streaming device can initiate a secure session with each other.

At 1204, the method can include the computing device transmitting control instructions to the user device for a response from the user device based at least in part on the detection, the response comprising an indication as to whether to initiate a transient session of a streaming service. The control instructions can include, for example, instructions to display a prompt asking the user whether to initiate a transient session. The control instructions can also include instructions to determine whether the user has previously configured a user specification on the user device to transmit an indication, without an additional manual input, that a transient session should be initiated on a second user's media streaming device.

At 1206, the method can include the computing device transmitting, to an application server of a steaming service, a request for a transient session token based at least in part on the response from the user device. The request can be without transmitting the user's username or password for the streaming service. In this sense, neither the computing device does not store the username or password. Therefore, once the user leaves (e.g., checks out of hotel), the computing device does not include the username and password, and a subsequent guest cannot access the account.

At 1208, the method can include the computing device receiving, from the application server of the streaming service provider, the transient session token, the transient session token including an expiration parameter. The transient token can be distinguished from a token obtained from a user logging in, for example, from their own house and/or own media streaming device. The transient token can include an expiration parameter that includes one or more rules for terminating the transient session based on the user no longer wanting to terminate the session.

At 1210, the method can include the computing device initiating by the computing device, the transient session based at least in part on the transient session token, the transient session comprising presenting content provided by the application server on a presentation device. For example, the user can watch a movie streaming on a hotel television using their streaming account.

At 1212, the method can include the computing device terminating the transient session based at least in part on the expiration parameter. For example, the transient token can be configured to include a time limit. The time limit can cause a transient session to end without the user having to log out of the account. For example, if the user is staying at a hotel for two days and the time limit is one and a half days, the transient session can terminate after one and a half days regardless of whether the user logs out of the account. Therefore, the next hotel guest will not be able to access the user's account even if the user forgot to log out.

While specific embodiments have been described, one skilled in the art will recognize that numerous modifications are possible. A single controller may use processes described herein to establish pairings with any number of accessories and to selectively communicate with different accessories at different times. Similarly, a single accessory may be controlled by multiple controllers with which it has established pairings. Any function of an accessory may be controlled by modeling the function as a service having one or more characteristics and allowing a controller to interact with (e.g., read, modify, receive updates) the service and/or its characteristics. Accordingly, protocols and communication processes as described herein may be "universal," meaning that they may be applied in any context with one or more controllers and one or more accessories regardless of accessory function or controller form factor or specific interfaces.

Thus, although specific embodiments have been described, it will be appreciated that embodiments may include all modifications and equivalents within the scope of the following claims.

As described above, one aspect of the present technology is the gathering and use of data available from specific and legitimate sources to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records relating to a user's application accounts (e.g., streaming service account), date of birth, or any other personal information.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk may be minimized by limiting the collection of data and deleting data once it is no longer needed. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, content may be selected and delivered to users based on aggregated non-personal information data or a bare minimum amount of personal information, such as the content being handled only on the user's device or other non-personal information available to the content delivery services.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein may be implemented on the same processor or different processors in any combination. Accordingly, where components or modules are described as being configured to perform certain operations, such configuration may be accomplished, e.g., by designing electronic circuits to perform the operation, by programming programmable electronic circuits (such as microprocessors) to perform the operation, or any combination thereof. Processes may communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments may be utilized in any number of environments and applications beyond those described herein without departing from the broader spirit and scope of the specification. The specification and drawings are, accordingly, to be regarded as illustrative rather than restrictive.

What is claimed is:

1. A method, comprising:
    receiving, by a computing system and from a media streaming device, a request for a transient session token for initiating a transient session of a streaming service;
    transmitting, by the computing system and to the media streaming device, an authentication request for authenticating a user account that is associated with the streaming service, wherein the authentication request is transmitted based at least in part on the receipt of the request for the transient session token;
    receiving, by the computing system and from the media streaming device, an authentication response based at least in part on transmitting the authentication request;
    authenticating, by the computing system, that the user account is associated with the streaming service based at least in part on receiving the authentication response; and
    transmitting, by the computing system, the transient session token to the media streaming device, wherein the transient session token comprises an expiration parameter for ending the transient session of the streaming service.

2. The method of claim 1, wherein the authentication response does not include user identification information associated with the user account.

3. The method of claim 1, wherein the method further comprises:
    generating a challenge request based at least in part on the receipt of the request for the transient session token, wherein the challenge request comprises a value, and wherein the transmitted authentication request comprises the challenge request; and
    storing the challenge request.

4. The method of claim 2, wherein authenticating that is user account is associated with the streaming service comprises:
    decrypting the authentication response received from the media streaming device, wherein the decrypted authentication response comprises a second value;
    accessing the stored challenge request; and
    comparing the value to the second value, wherein the transient session token is transmitted to the media streaming device based at least in part on the comparison.

5. The method of claim 1, wherein the method further comprises:
    receiving, prior to expiration of the transient session; a second request for a reauthentication of the user account being associated with the streaming service;
    reauthenticating that the user account being associated with the streaming service based at least in part on the second request; and
    transmitting a second transient session token to the media streaming device, based at least in part on the reauthentication.

6. The method of claim 1, wherein the method further comprises:
    transmitting streaming service content associated with the user account to the media streaming device based at least in part on transmitting the transient session token to the media streaming device.

7. The method of claim 1, wherein the expiration parameter comprises an instruction for media streaming device to terminate the transient session of the streaming service based at least in part on an indication that streaming service content is no longer being accessed via the user account.

8. The method of claim 1, wherein the expiration parameter comprises an instruction for media streaming device to terminate the transient session of the streaming service based at least in part on an expiration of a time limit.

9. A computing system comprising:
    one or more processors; and
    one or more non-transitory computer-readable storage media comprising instructions which, when executed on the one or more data processors, cause the one or more processors to:
        receive, from a media streaming device, a request for a transient session token for initiating a transient session of a streaming service;
        transmit, to the media streaming device, an authentication request for authenticating a user account that is associated with the streaming service, wherein the authentication request is transmitted based at least in part on the receipt of the request for the transient session token;
        receive, from the media streaming device, an authentication response based at least in part on transmitting the authentication request;
        authenticate that the user account is associated with the streaming service based at least in part on receiving the authentication response; and
        transmit the transient session token to the media streaming device, wherein the transient session token comprises an expiration parameter for ending the transient session of the streaming service.

10. The computing system of claim 9, wherein the authentication response does not include user identification information associated with the user account.

11. The computing system of claim 9, wherein the instructions which, when executed on the one or more data processors, further cause the one or more processors to:
    generate a challenge request based at least in part on the receiving the request for the transient session token, wherein the challenge request comprises a value, and wherein the transmitted authentication request comprises the challenge request; and store the challenge request.

12. The computing system of claim 11, wherein authenticating that is user account is associated with the streaming service comprises:

decrypting the authentication response received from the media streaming device, wherein the decrypted authentication response comprises a second value;

accessing the stored challenge request; and comparing the value to the second value, wherein the transient session token is transmitted to the media streaming device based at least in part on the comparison.

13. The computing system of claim 9, wherein the instructions which, when executed on the one or more data processors, further cause the one or more processors to:

receive, prior to expiration of the transient session; a second request for a reauthentication of the user account being associated with the streaming service;

reauthenticating that the user account being associated with the streaming service based at least in part on the second request; and transmitting a second transient session token to the media streaming device, based at least in part on the reauthentication.

14. The computing system of claim 9, wherein the instructions which, when executed on the one or more data processors, further cause the one or more processors to:

transmit streaming service content associated with the user account to the media streaming device based at least in part on transmitting the transient session token to the media streaming device.

15. The computing system of claim 9, wherein the expiration parameter comprises an instruction for media streaming device to terminate the transient session of the streaming service based at least in part on an indication that streaming service content is no longer being accessed via the user account.

16. The computing system of claim 9, wherein the expiration parameter comprises an instruction for media streaming device to terminate the transient session of the streaming service based at least in part on an expiration of a time limit.

17. One or more non-transitory computer-readable media configured to store instructions executable by one or more processors of a computing system that, when executed by the one or more processors, cause the one or more processors to:

receive, from a media streaming device, a request for a transient session token for initiating a transient session of a streaming service;

transmit, to the media streaming device, an authentication request for authenticating a user account that is associated with the streaming service, wherein the authentication request is transmitted based at least in part on the receipt of the request for the transient session token;

receive, from the media streaming device, an authentication response based at least in part on transmitting the authentication request;

authenticating, by the computing system, that the user account is associated with the streaming service based at least in part on receiving the authentication response; and transmit the transient session token to the media streaming device, wherein the transient session token comprises an expiration parameter for ending the transient session of the streaming service.

18. The one or more non-transitory computer-readable media of claim 17, wherein the authentication response does not include user identification information associated with the user account.

19. The one or more non-transitory computer-readable media of claim 17, wherein the instructions which, when executed on the one or more data processors, further cause the one or more processors to:

generate a challenge request based at least in part on the receiving the request for the transient session token, wherein the challenge request comprises a value, and wherein the transmitted authentication request comprises the challenge request; and store the challenge request.

20. The one or more non-transitory computer-readable storage media of claim 19, wherein authenticating that is user account is associated with the streaming service comprises:

decrypting the authentication response received from the media streaming device, wherein the decrypted authentication response comprises a second value;

accessing the stored challenge request; and comparing the value to the second value, wherein the transient session token is transmitted to the media streaming device based at least in part on the comparison.

* * * * *